Figure 1:
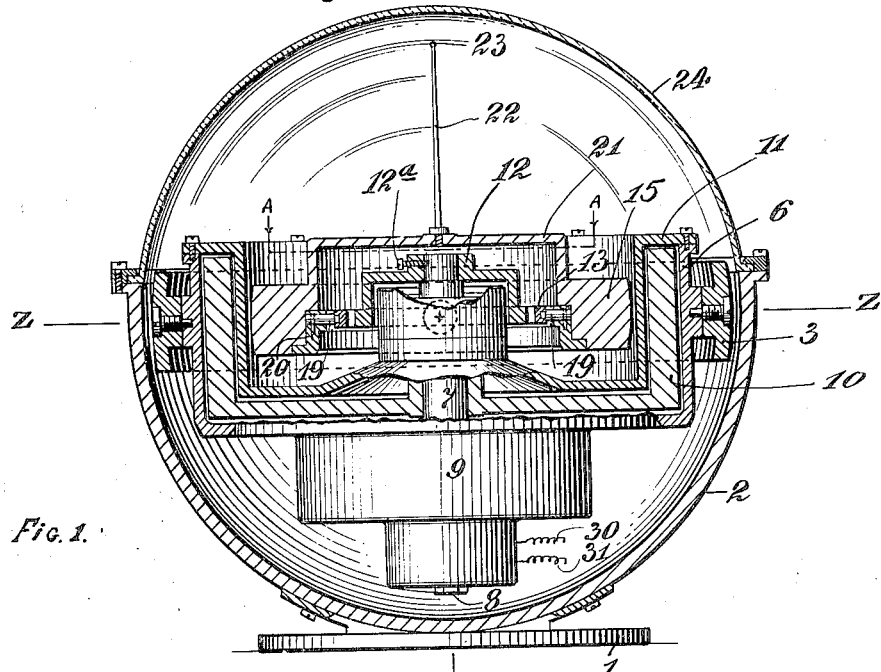

Oct. 19, 1926.

C. M. PAXTON 1,603,352

GYROSCOPIC DEVICE AND METHOD

Original Filed Dec. 1, 1920

Clifford M. Paxton
INVENTOR

BY George C. Dean
ATTORNEY

Patented Oct. 19, 1926.

1,603,352

UNITED STATES PATENT OFFICE.

CLIFFORD M. PAXTON, OF BROOKLYN, NEW YORK, ASSIGNOR TO PAXTON GYROSCOPE CORPORATION, A CORPORATION OF NEW YORK.

GYROSCOPIC DEVICE AND METHOD.

Application filed December 1, 1920, Serial No. 427,467. Renewed March 23, 1926.

My present invention has been devised as an improved gyroscopic inclinometer for indicating earth verticals and horizontals on aeroplanes, submarines and other unsteady or dirigible vehicles or platforms, but it will be obvious to those skilled in the art that certain features of my invention may be employed in connection with other gyroscopes, particularly direction-indicating gyroscopes as, for instance, gyroscopic compasses.

In its preferred embodiment as an inclinometer, the invention includes a gyroscope comprising two interconnected gyro rotors, one of which I may term the "primary" gyro and the other the "secondary" gyro, the latter being used for averaging and substantially correcting for a desired predetermined interval, any erroneous indications due to angular deflection of the primary gyro from its normal operating position.

This functioning of the secondary gyro is caused and permitted by connecting it with and driving it from the shaft of the primary gyro by means of a universal joint, the center of which is preferably at the intersection of the axes of the primary and secondary gyros.

The functioning of the secondary gyro depends upon the discovery that when mounted upon and driven by another shaft, through a universal joint, a gyro tends to align its axis with the axis of the primary shaft.

For best results the mounting should be such that the center of angular movement of the secondary gyro should be coincident with the center of angular movement of the primary gyro. The aligning tendency is automatically developed and brought into operation by friction in the universal joint which exerts an angular torque when the axes are out of alignment, the torque tending to rotate both elements out of their respective planes of spin tending to cause precession of each toward alignment with the other, the actual resultant movements being dependent upon their relative gyroscopic stabilities and their external resistances such as those imposed by the resistance or structure of their respective mountings. The smaller the friction in the universal joint the less will be the power and speed of the automatic self-aligning movements, and the more effective will be the stability or tendency of the gyro to maintain its own fixed direction which it has by reason of the mass and angular velocity of its rotor.

This makes it possible to design the secondary gyro for any desired degree of stability and rate of re-alignment with the primary shaft by selecting a predetermined mass and rate of rotation, such as will give the gyro a desired degree of resistance to angular displacement and by selecting a predetermined value for the friction in the universal joint, such as will produce a desired displacement effort when the shafts are out of line.

The neutral gyro, while capable of ultimately aligning itself with a normal, long continued displaced position of the pendulous gyro, will nevertheless maintain its original vertical direction for a relatively long time after the secondary gyro has been displaced, and in practice the self-aligning tendency of the neutral gyro may be such that it will substantially maintain the original correct vertical of the earth until the pendulous gyro is again restored to vertical, even though the displacement of the pendulous gyro continue for a considerable time.

The desirability of such qualities for a gyro mounted upon and driven by the usual gyro of an inclinometer or compass will be obvious.

In the inclinometer any known or desired form of gyro and motor may be employed as a primary gyro, its universal mounting being such that it is slightly pendulous, so that the shaft and spinning axis of the primary gyro are normally maintained vertical to the earth. The secondary gyro rotor may then be mounted on one end of the primary gyro shaft by a universal joint located with its center of movement substantially coincident with that of the main mounting of the primary gyro. Though the device as a whole may be pendulous, the secondary gyro is preferably balanced in neutral equilibrium with respect to each of its universal joint supports. In certain cases the secondary gyro may be slightly top heavy thereby giving it ballistic tendencies opposite to those of the primary gyro and operating to decrease the power and speed of automatic alignment with the axis of the primary gyro, during times of ballistic torque, but the top heavy tendency must not be increased up to a point where it would exceed the self-aligning effort exerted by gyroscopic reaction and the friction in the universal mounting.

With this combination I am able to overcome and correct to any desired extent the errors which, so far as I am aware, are characteristic of all gyro inclinometers. These errors are due to the ballistic tendency which a gyro has by reason of the pendulous character of the mechanism. When the aeroplane or other support is speeding up or slowing or moving on a curve, the inertia of the pendulous mass, no matter how slightly pendulous it may be, causes deflection from the true vertical, and hence a false indication. In the case of aeroplanes this deflection frequently mounts to 5° or more, notwithstanding all the refinements of construction and operation that have heretofore been proposed. In the case of my compound gyro however, it will be evident that the secondary gyro may be given self-aligning tendency just sufficient to make it assume the vertical position within a reasonable length of time, preferably much greater than the average duration of the accelerating, decelerating or turning movements of the craft. Thus designed, the secondary gyro will normally give the correct indication of vertical, identical with the normal indication given by the primary gyro, and, in addition, will continue to give the same correct indication, during periods of ballistic deflection. Theoretically the secondary gyro will begin to so align itself with any deflected position of the primary gyro as soon as the deflection of the latter begins, but in practice the error thus introduced may be made negligible for relatively long periods. Moreover even if for any reason the displacement of the primary gyro continues for long enough time to have appreciable effect upon the direction of the secondary gyro, any error thus introduced will be automatically corrected when the primary gyro returns to normal vertical position. Moreover, the self-aligning reactions are mutual and opposite, the primary gyro being pulled back toward normal by the secondary gyro so that even small errors may be partially averaged down to an extent dependent on their gyroscopic stabilities. As the precession of the pendulous gyro is at right angles to the gravitational impulse tending to return it to the vertical, it is readily seen that the gyro returns to vertical through a spiral path.

If desired a third gyro or any desired number of gyros may be serially related through universal joints, each successive gyro bearing a relation to the preceding gyro, similar to that of the "secondary" and "primary" gyros.

Figure 2:
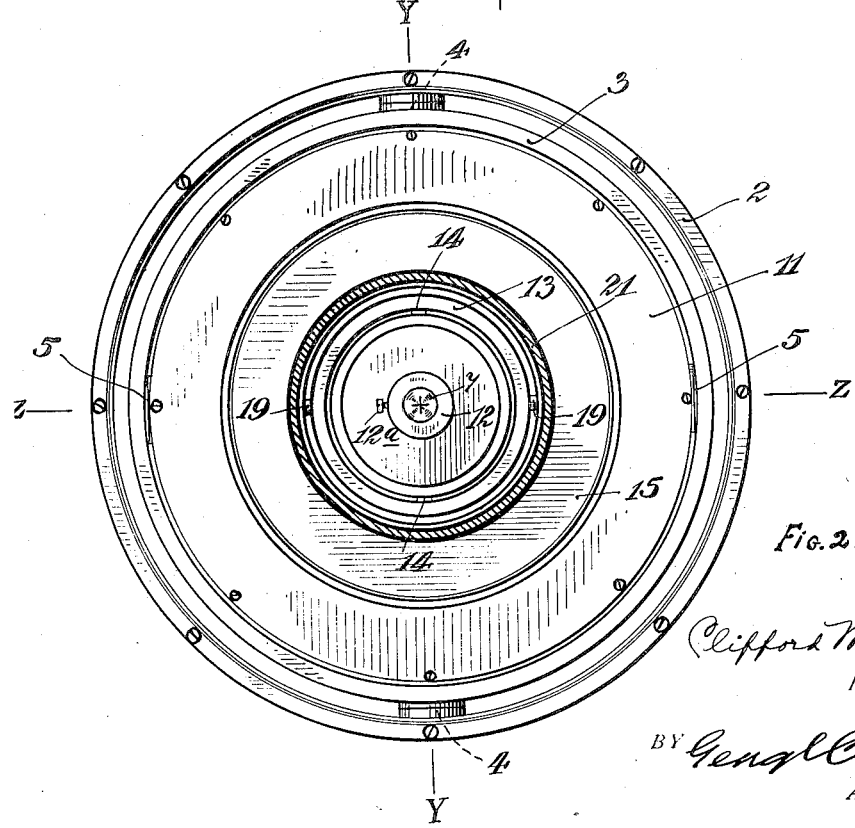

The above and other features of my invention may be more fully understood from the following description in connection with the accompanying drawings in which, Figure 1 is a vertical central section showing an inclinometer embodying my present invention;

Figure 2 is a top plan view partly in section on the line A—A of Figure 1.

In these drawings the device is shown as comprising a suitable base 1 adapted to be fixed to the aeroplane or other movable platform on which the device is to be used. The base 1 has rigidly secured thereto a support 2 which is preferably in the form of an enclosing bowl, the interior of which may be approximately spherical. The bowl serves as a support for a gimbal ring 3 pivotally mounted at 4, 4 for rotation about horizontal axis Y—Y. Within the gimbal ring 3 and at right angles to axis Y—Y are other pivots 5, 5 permitting movement about axis Z—Z of the casing support 6 for the vertical shaft 7, supported in the bearing 8, which may be of any known or desired construction, preferably that shown in my application, Serial No. 423,641, filed Nov. 12, 1920. Within the cylindrical extension 9 on casing 6 may be located an electric or other motor for driving shaft 7 at high speed.

The center of mass of casing 6 and shaft 7 is below pivotal axes Z—Z and Y—Y so that the structure is sufficiently pendulous to normally maintain shaft 7 in the vertical position.

While a mere pendulum, such as would be afforded by such mounting of the above-described parts, might be used under certain conditions, as means for maintaining shaft 7 in normally vertical position, by gravity alone, I prefer to make the shaft 7 the spinning axis of a gyro rotor 10. In such case the latter is preferably dished and closed in by a correspondingly dished cover plate 11 so as to afford an interior cavity in which the secondary gyro may be located; but it will be understood that this is for compactness and that such dishing is not necessary.

The upper end of shaft 7 is, in any event, provided with a universal joint, in this case shown as a hub member 12 secured by screw 12ª, from which is suspended ring 13 on horizontal pivots 14, 14. Gimbal ring 13 supports the secondary gyro rotor 15 through exterior pivots 19, 19 at right angles to pivots 14. This secondary universal mounting is preferably in the same plane and has the same centers of universal movement as the exterior pivots 4, 4, 5, 5. For convenience in manufacture I arrange pivots 19 in an annular member 20 which may be force-fitted into the rotor as indicated in the drawings. The vertical axis of the secondary gyro 15 is of course the indicating axis and for convenience of observation I prefer to form the rotor with a bridge or web portion 21 having centrally thereof a vertical index 22 provided with a sighting point 23 which may be provided with a light or with radio-active material for observation in the dark.

Preferably the entire instrument and supporting bowl is closed in by spherical glass cover 24, on which may be painted, etched or otherwise marked, preferably in degrees, the markings preferably extending circularly after the manner of parallels of latitude on a globe. It is to be noted that when cover 24 is so used for scale markings it must be mounted in fixed relation to the main support of the instrument and not on the pendulously or otherwise stabilized base.

The motor within casing 9 may be connected through flexible wires as 30, 31, with any suitable source of current. In cases where the gyro is likely to turn end over end, as in looping the loop on an aeroplane, the circuit will be brought through gimbal mounting in the usual way, as by collector rings and brushes on the pivotal axes.

With a properly designed primary gyro 10 and motor for rotating it at speed which will give it proper gyroscopic stabilizing power and with a mounting which will bring its center of gravity high enough so that the mass is only slightly pendulous, the primary gyro itself may constitute an inclinometer of great accuracy, except when subjected to ballistic torque. The secondary gyro is of course equally accurate at such times and in addition maintains its direction and continues accurate when the primary gyro precesses in response to ballistic torque.

Obviously the mounting of the secondary gyro and the amount of clearance thereof for angular rotation with respect to the primary gyro or other stabilized base will be such as to permit the secondary gyro to fully take care of such errors as will be found likely to occur in practical use of the device. In all ordinary cases the clearance shown in the drawings should be sufficient for this purpose.

It will be noted that the gimbal ring 13 is itself gyroscopic in its reactions and that in certain cases these may be useful. Hence, the size and weight of said ring may be increased beyond that indicated in the drawings and under certain conditions advantage may be derived from so doing. Conversely a simple universal joint, without a gimbal ring, may be used at this point with a view to diminishing such gyroscopic effect.

From the above it will be evident that so far as concerns the broader aspects of my invention, the term "primary" as applied to the high speed shaft 7 and as applied to the rotor 10 which may or may not be mounted thereon, and the term "secondary" as applied to a gyro 15 are both used as words of identification rather than in a limiting or functional sense. For instance, the peculiar reactions utilized may be developed where the motive power is applied to the gyro 15, the shaft 7 then being the driven shaft instead of a driving shaft. The so-called "primary" gyro may have its rotating mass, and thus its gyroscopic stability greatly reduced, even to the extent of dispensing with the wheel 10; while the mass of the so-called "secondary" gyro may be increased to any desired extent so that its gyroscopic stability becomes very great as compared with the stability of the "primary" rotating elements. In an extreme case, this may be carried to the point where the primary or supporting shaft 7 tends to maintain vertical by reason of its pendulous mounting, the gyroscopic stability afforded by its own rotating mass being negligible. Shafts 7 may be made vertically tending in any desired way, as, for instance, said shaft may be mounted in any suitable stabilized base, usable in lieu of a pendulum, as for instance the special form of separate, gyroscopically-stabilized base shown in my prior application, Serial No. 351,236, filed January 13, 1920.

When two gyros are employed in combination so as to constitute a compound gyro unit for use as the directionally sensitive element of a gyro compass, many variations are possible. In general, however, the gyro element corresponding to what I call the "primary" gyro may be mounted in the same way as a simple gyro unit would be, the principal precaution being that the spinning axis of the so-called "secondary" gyro element, should have its center or centers of angular movement coincident with those of the primary gyro element. If the compound gyro is used in compasses of the type invented by me and shown in my various prior applications, particularly Patent No. 1,380,335, granted May 31, 1921, the primary gyro element will be substantially balanced in substantially neutral equilibrium on pivotal axes permitting universal angular movement to and from parallelism with the earth's axis, and the secondary gyro element will have its center of universal movement substantially coincident with the center of universal movement of said primary element; and preferably said secondary gyro will also be balanced in neutral equilibrium, although in certain connections it may be sufficient if the two gyro elements constituting the compound gyro, are balanced as a whole when functioning with their axes in alignment.

Broadly considered my invention includes a compound gyro comprising a plurality of gyro elements that are, so to speak, loosely coupled in such a way that when in operation, they have a predetermined tendency to seek alignment of their spinning axes and to the extent of such tendency they may function as a unit, but they are subject to different kinds or degrees of torque and are capable of reacting differently, particularly as regards precessing or maintaining fixed direction when one of them is subjected to stress or restraint.

The arrangement of the high speed rotor element may be reversed without violating the principle involved. For instance, the primary gyro, casing and motive parts may be suspended in balanced or neutral equilibrium and the secondary gyro made pendulous to any desired degree, in which case it might be preferable to suspend the secondary gyro below instead of above the primary. In such case the indication would be taken from the primary instead of the secondary rotor and such an arrangement might be desirable when it is desired to repeat the indication of the instrument to other devices, such, for instance, as control mechanisms which might be employed in automatic stabilizing or otherwise.

In most forms of the device, the matter of relative positions of centers of angular movement of the pivotal mountings for the rotors, is important. Locating the center of the joint connecting the two rotors, at the intersection of their respective axes permits both rotors to run true and to come into exact alignment, whereas eccentricity at this point will introduce a gyratory wobble of one or the other of the high speed rotors, and such wobble is likely to have a destructive mechanical effect upon the bearings besides impairing the functioning of the device and the accuracy of its indications.

The additional feature of having the angular movement of the joint between the rotors concentric with the center of the gimbal support, makes angular movement of one spinning axis entirely independent of the other except for the precession producing friction in the joint between the rotors, whereas if said centers are spaced apart, relative angular movement of one spinning axis will exert a motion producing leverage on the other spinning axis.

This will have the effect of laterally displacing the spinning axis and index element of the secondary gyro with respect to the center of the scale on the transparent cover, but if the gyro is approximately balanced in neutral equilibrium, such bodily displacement effort being applied at the center of mass will cause no precession-producing torque on the secondary gyro. Hence such displacement will be merely to a parallel position and the resulting error will be less than the eccentricity of the centers which will be measured in degrees on the scale, will be small. On the other hand if the secondary gyro is either top heavy or pendulous, the lateral movement will tend to introduce a positive torque being unnecessary and in most cases very undesirable for proper functioning of the instrument.

I claim:—

1. A pendulously mounted high speed rotary element and a gyro, one carried solely by the other, and an intermediate universal joint having its center of angular movement in the spinning axis of said rotary element and in the spinning axis of said gyro, in combination with means for applying power to one of said elements, to spin it about its own axis thereby to apply power through the universal joint to spin the other of said elements about its axis, and supporting means permitting relative movement of said members to and from positions of alignment of their spinning axes.

2. A high speed rotary element, a gyro, and an intermediate universal joint whereby the gyro is carried solely by said high speed rotary element, said joint having its center of angular movement in the spinning axis of the said rotary element and in the spinning axis of said gyro, in combination with a pendulous mounting for said high speed rotary element adapted to cause a vertical tendency of the spinning axis of the latter and means for applying power to said high speed rotary element to spin it about its own axis, thereby to apply power through the universal joint to spin the gyro about its axis, for the purpose described.

3. A high speed rotary element, a gyro, and an intermediate universal joint whereby the gyro is carried solely by said high speed rotary element, said joint having its center of angular movement in the spinning axis of said rotary element and in the spinning axis of said gyro, in combination with a pendulously and gyroscopically stabilized base as a support for maintaining the high speed rotary element with its spinning axis in a normally vertical position.

4. A high speed shaft and two gyro elements rotated therefrom and a universal joint positively coupling said gyro elements to precess independently and to spin at all times at equal angular velocities.

5. A compound gyro comprising two gyro elements, a universal joint connecting said elements to drive one from the other, said joint including a gyroscopic element and having its center approximately in the spinning axes of both gyros.

6. An inclinometer embodying a primary gyro, a mounting affording three degrees of freedom therefor, and means for spinning said gyro, in combination with a secondary gyro and a universal joint connection whereby said second gyro is capable of limited universal movement with respect to the axis of said primary gyro.

7. An inclinometer comprising a universally mounted, pendulous, stabilizing gyro, a non-pendulous indicating gyro and a universal joint whereby the axle of the said indicating gyro is mounted upon and driven by the axle of said stabilizing gyro.

8. A compound gyro comprising a plurality of serially arranged gyro rotors one supported from another, and a universal joint connecting said gyros for driving the latter from the former.

9. In combination, a plurality of gyros, each mounted with freedom for universal angular movement through desired arcs of a sphere, and gyroscopic means non-positively urging said gyros toward a desired predetermined angular relation of their axes, one of said gyros having a definite predetermined directional bias.

10. An inclinometer including a gyroscopic indicating element and a gyroscopic control element, one of said elements being pendulous, and means connecting said elements to maintain their axes in alinement or return them to alignment.

11. An inclinometer including a gyroscopic non-pendulous indicating element and a gyroscopic pendulous stabilizing element, and loose coupling means connecting said elements to impart thereto a predetermined tendency toward positions of alignment of their spinning axes.

12. The combination set forth in claim 11 in which the two gyroscopic elements are mounted for universal movement about a common center.

Signed at New York in the county of New York and State of New York this 30th day of November, A. D. 1920.

CLIFFORD M. PAXTON.